United States Patent
Taylor et al.

(10) Patent No.: US 6,962,041 B1
(45) Date of Patent: Nov. 8, 2005

(54) WINDGUARD FOR ROUND BALER INCLUDING FLOAT ARMS

(75) Inventors: J. Levi Taylor, Narvon, PA (US); Kevin M. Smith, Narvon, PA (US); John R. McClure, New Holland, PA (US)

(73) Assignee: CNH America LLC, New Holland, PA (US)

( * ) Notice: Subject to any disclaimer, the term of this patent is extended or adjusted under 35 U.S.C. 154(b) by 89 days.

(21) Appl. No.: 10/903,719

(22) Filed: Jul. 31, 2004

(51) Int. Cl.[7] .................. A01D 89/00; A01D 39/00
(52) U.S. Cl. ................................ 56/364; 56/341
(58) Field of Search ................ 56/341–344, 432, 56/364, 350, DIG. 9, DIG. 20, DIG. 24; 100/88, 89

(56) References Cited

U.S. PATENT DOCUMENTS

| | | | |
|---|---|---|---|
| 2,524,233 A | 10/1950 | Russell | 56/364 |
| 2,691,266 A | 10/1954 | Meyer et al. | 56/364 |
| 2,703,957 A | 3/1955 | Russell | 56/364 |
| 3,491,523 A | 1/1970 | Bornzin | 56/2 |
| 3,676,988 A | 7/1972 | Hauser-Lienhard | 56/1 |
| 3,815,344 A | 6/1974 | Kucera | 56/341 |
| 3,924,391 A | 12/1975 | Cheatum | 56/364 |
| 3,943,845 A | 3/1976 | Mecklin et al. | 100/189 |
| 4,386,493 A | 6/1983 | Holdeman et al. | 56/341 |
| 4,411,127 A | 10/1983 | Diederich, Jr. et al. | 56/364 |
| 4,550,556 A | 11/1985 | Meiners | 56/341 |
| 5,293,732 A | 3/1994 | Vogelgesang et al. | 56/16.4 |
| 6,029,434 A | 2/2000 | Ratzlaff et al. | 56/341 |
| 6,295,797 B1 | 10/2001 | Naaktgeboren et al. | 56/364 |
| 6,314,709 B1 | 11/2001 | McClure et al. | 56/364 |
| 6,688,092 B2 | 2/2004 | Anstey et al. | 56/220 |

OTHER PUBLICATIONS

U.S. Appl. No. 10/903,194, filed Jul. 31, 2004, Kevin M. Smith et al.

*Primary Examiner*—Robert E Pezzuto
(74) *Attorney, Agent, or Firm*—John William Stader

(57) ABSTRACT

A single floating windguard that pivots at the front and the middle of the tine section causing the tines to maintain contact with the crop at all times as it moves over the pickup and across the stuffer assembly.

6 Claims, 1 Drawing Sheet

WINDGUARD FOR ROUND BALER INCLUDING FLOAT ARMS

BACKGROUND OF THE INVENTION

The present invention relates generally to hay balers, and more particularly to an improved wind guard system for the crop pickup and stuffer assembly of a round baler.

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, most likely a round baler, is pulled along the windrows to pick up the crop material and form it into cylindrically-shaped round bales. More specifically, the pickup of the baler gathers the cut and windrowed crop material from the ground. The pickup assembly then conveys the cut crop material with a conveyor, such as a rotating conveying rotor, into a bale-forming chamber within the baler. The pickup assembly has a drive mechanism that operates to activate both the pickup and the conveying rotor, and the pickup drive mechanism is operably connected to and driven by the main drive mechanism of the baler. The baling chamber consists of a pair of opposing sidewalls with a series of belts that rotate and compress the crop material into a cylindrical shape. When the bale has achieved a desired size and density, the operator wraps the bale to ensure that the bale maintains its shape and density. The operator raises the tailgate of the baler and ejects the bale onto the ground. The tailgate is then closed and the cycle repeated as necessary and desired to manage the field of cut crop material.

The rotor conveyor mechanism ("rotor" or "rotor mechanism") between the pickup and the bale-forming chamber is, itself, known in the prior art, as shown, for example, in U.S. Pat. Nos. 5,595,055 and 6,644,006. The rotor mechanism is usually referred to as the "stuffer", because it stuffs the crop material into the gap between the floor roll and the starter roll into the bale-forming chamber.

It has been customary to provide the pickup mechanism with a lower wind guard which pivots and floats to hold down the hay or other crop material as it is being fed rearwardly to prevent the crop material from being blown off the pickup floor and to ensure an adequate compaction of the crop material for good feeding into the stuffer mechanism. Additionally, a separate wind guard is sometimes included above the stuffer assembly; however, this wind guard pivots only, without floating. The pivot point of known upper wind guards is positioned well above the stuffer assembly to allow large slugs of crop to pass underneath. With this high pivot position, the wind guard often fails to keep the crop compressed when under normal crop flow. When the crop is not compressed as it enters the bale-forming chamber, difficulties in starting a bale can occur.

Conventional wind guards are fairly simple structures, and include an elongated pipe-like member, often referred to as a wind guard pipe, extending across the front of the pickup mechanism with a plurality of tines attached to the wind guard pipe along its length extending rearwardly over the pickup mechanism. This type of wind guard may be manually adjusted for different sizes of windrows of crop material by positioning the wind guard pipe and the tines closer to the pickup mechanism for small windrows or farther away from the pickup mechanism for large windrows. If the wind guard is adjusted for small windrows and a large windrow is encountered, the wind guard pipe and tines may be too close to the pickup mechanism to accommodate the large windrow. This could cause plugging of the pickup mechanism. If the wind guard is adjusted for large windrows and a small windrow is encountered, the wind guard tines may be too far away from the pickup mechanism to protect the small windrow. This could result in wind loss of crop material, or, as mentioned above, difficulties in starting the bale core.

It would improve the operation of agricultural crop pickups if the problems identified above could be overcome.

SUMMARY OF THE INVENTION

Accordingly, it is an object of the present invention is to provide an improved wind guard system for round balers.

Another object of the present invention is to provide an improved single unit wind guard for the pickup and stuffer of a round baler.

It is another object of the instant invention to provide a single unit wind guard that pivots and floats above the pickup and pivots above the stuffer of a round baler.

It is another object of the instant invention to provide a single floating windguard that allows the tines to pivot both at the front of the wind guard and in the middle of the tine section.

It is yet another object of this invention to provide a single floating windguard that causes the tines to maintain contact with the crop at all times as the crop moves over the pickup and by the stuffer of a round baler.

It is another object of this invention to provide a windguard for a round baler that is durable in construction, inexpensive of manufacture, carefree of maintenance, facile in assemblage, and simple, versatile and effective in use.

These and other objects are attained by providing a single floating windguard that pivots at the front and the middle of the tine section causing the tines to maintain contact with the crop at all times as it moves over the pickup and across the stuffer assembly.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Figure 1:
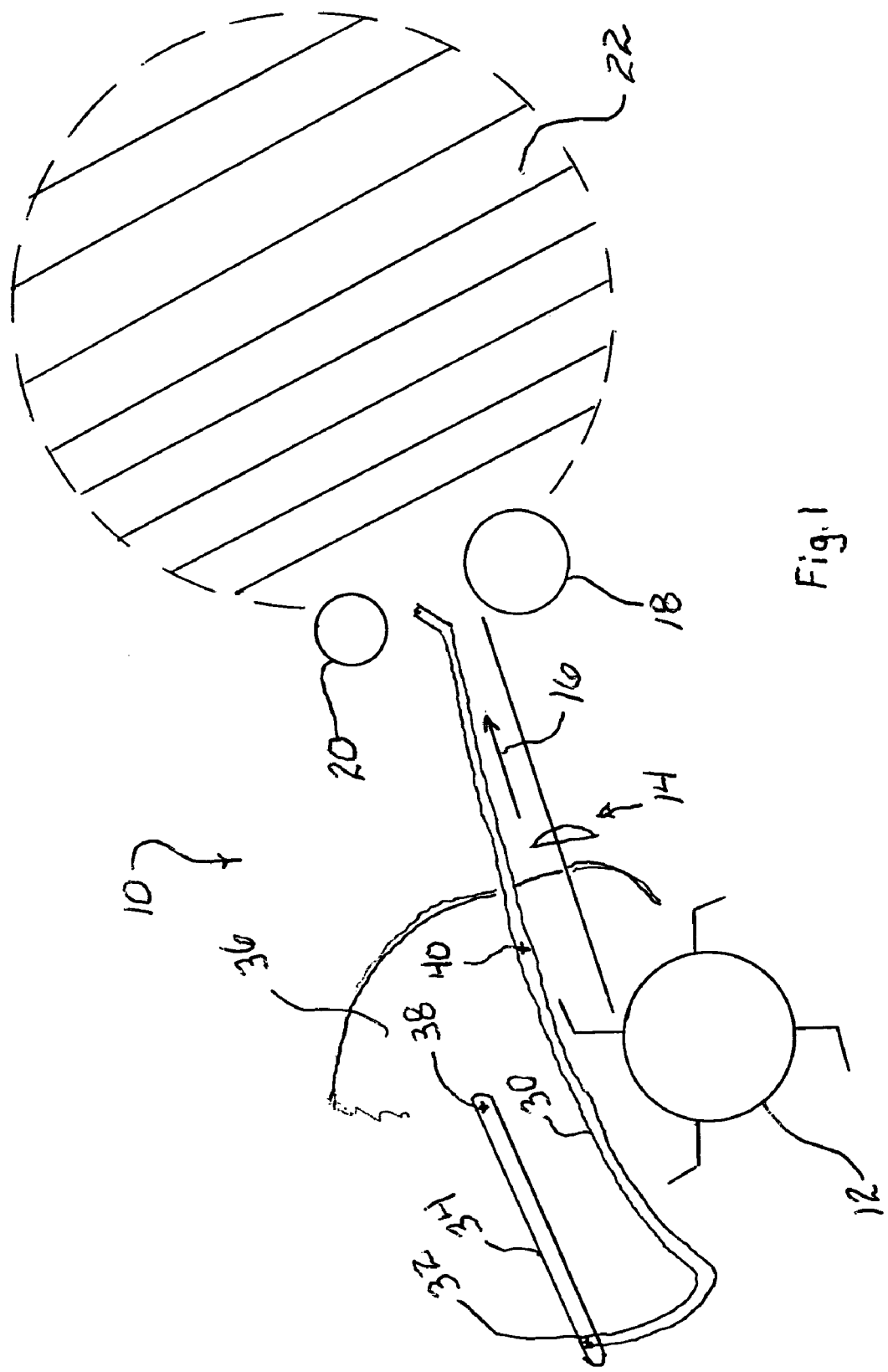
FIG. 1 is a partial side sectional view of a round baler pickup, stuffer and bale-forming chamber showing the wind guard of the instant invention in place for normal operation.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Round balers are well known in the agricultural industry, and the instant invention can be used with any of such machines that employ a stuffer assembly, as generally described above. Reference is made, for example, to U.S. Pat. Nos. 6,688,092 and 6,295,797 that illustrate two such balers.

FIG. 1 shows an agricultural round baler generally depicted at 10 as it would be pulled from right to left along a windrow of cut crop material by a tractor (not shown). Baler 10 is comprised of a wheel-supported bale-forming mechanism with a crop pickup 12 for moving the crop material from the field along and past the stuffer assembly 14 in the direction of arrow 16. The stuffer assembly pushes the crop material into the gap between the floor roll 18 and the starter roll 20 and thence into the bale-forming chamber 22. Pickup 12 is usually wider than the bale-forming chamber of the baler 10 and includes its own frame mounted to the main frame of the baler for pivoting about a horizontal transverse axis.

As alluded to previously, the crop in the field is usually arranged in a windrow as it is engaged by the pickup 12. Depending upon the condition of the crop, i.e., the volume and length of crop, the flow of the crop material through the pickup and stuffer can range from fairly constant to irregular, and may contain frequent or infrequent slugs—a larger than normal volume of material. The issue addressed herein relates to the discovery that the core of a bale, and the starting of a new bale, is improved if the crop being fed into the gap between the floor roll and the starter roll is compressed rather than fluffed or feathery.

The prior art, as exhibited for instance in the '092 patent identified above, recognizes that a wind guard properly located above the pickup can promote a more continuous and even flow of crop material. The instant invention is to a significant improvement to the wind guard concept. Some current round balers with stuffers use two wind guards, one upper and one lower, to keep the crop compressed while being fed the pickup and stuffer into the bale-forming chamber. The lower wind guard is situated above the pickup and is capable of floating and pivoting. The upper wind guard is positioned above the stuffer assembly and pivots without floating. This upper windguard is positioned with the pivot well above the stuffer assembly to allow large slugs of crop material to pass underneath. With this high pivot position, the wind guard fails to keep the crop material compressed when under normal crop flow. As indicated, when the crop is not compressed when entering the bale chamber, difficulties in starting a bale core can occur.

Still referring to FIG. 1, a single floating wind guard that pivots at the front and the middle is shown; providing a substitute for the upper and lower wind guards of the prior art. The wind guard 30 is pivotably pinned at axis 32 to float arm 34 which is, in turn, pivotably pinned at axis 38 to the pickup frame 36. The pivoting about axis 38 provides a floating motion and characteristic to the wind guard 30. The lower wind guard tines pivot about axis 32 and the upper wind guard tines pivot about axis 40 where the tines 30 are pivotably pinned to pickup frame 36. With the additional pivot point 40, the tines are able to maintain contact with the crop at all times.

Obviously, references to the wind guard are to a transverse structure with a plurality of generally aligned tines that extend from in front of the pickup to a point adjacent the gap between the floor and starter rolls. The weight of the windguard is enough to maintain the crop in a compressed state while entering the bale-forming chamber. In operation, the crop is engaged by the pickup 12 and pushed toward the stuffer assembly 14. The lower portion of the wind guard 30, if for instance a slug is fed, pivots upwardly about axis 40 and floats about axis 32. As the slug moves rearwardly through the stuffer assembly 14 the slug causes the upper portion of the wind guard 30 to pivot upwardly (as the forward portion pivots downwardly. During this entire operation, the wind guard is in contact with the crop material, or slug, and maintains it in a compressed condition to be fed into the bale-forming chamber 22.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A wind guard for use on the pickup mechanism and stuffer assembly of a round baler, said pickup mechanism having first and second opposing spaced apart generally vertical side sheets and a transverse pickup reel rotatably supported therebetween, said baler including a transverse floor roll and a transverse starter roll with a transverse gap therebetween, said wind guard comprising:

a plurality of elongate spaced-apart tines having a first end and a remote second end, said tines attached together at a first position adjacent said first end of said times by a transverse tine frame member forming a first transverse pivot axis;

first and second elongate float arms each having a first and a remote second end, each float arm pivotably affixed adjacent the first end thereof to a respective side sheet of said pickup and affixed adjacent the second end thereof to said tine frame member for pivotable movement about said first transverse pivot axis such that the tines floated in position;

a transverse support member having a first and a remote second end, each said first and second end of said support member pivotably affixed to the respective opposing side sheet and said plurality of tines and forming a fixed second transverse pivot axis for said tines, said second transverse pivot axis being located generally above said stuffer assembly; and said tines extending from a location forwardly of and above the pickup reel to a location adjacent and between the floor roll and the starter roll whereby the tines are held in contact with crop material picked up by the pickup reel throughout its transport through the stuffer assembly and into the gap between the floor and starter rolls.

2. The wind guard of claim 1, wherein:
   said tines are formed into a generally gentle downwardly facing curve in the area above said pickup and stuffer assembly.

3. The wind guard of claim 2, wherein:
   each said first and second float arms extends forwardly to a location forward of and above said pickup mechanism, said plurality of tines extend generally downwardly is a generally gentle rearwardly facing curve before it begins the downwardly facing curve.

4. In a wind guard for use on a pickup mechanism and stuffer assembly of a round baler, said pickup mechanism having first and second opposing spaced apart generally vertical side sheets and a transverse pickup reel rotatably supported therebetween, said baler including a transverse floor roll and a transverse starter roll with a transverse gap therebetween, the improvement comprising:

said windguard including a plurality of elongate spaced-apart tines having a first end and a remote second end, said tines attached together at a first position adjacent said first end of said times by a transverse tine frame member, said frame member forming a first transverse pivot axis;

first and second elongate float arms each having a first and a remote second end, each float arm pivotably affixed adjacent the first end thereof to a respective side sheet of said pickup and affixed adjacent the second end thereof to said tine frame member for pivotable movement about said first transverse pivot axis such that the tines floated in position;

a transverse support member having a first and a remote second end, each said first and second end of said support member pivotably affixed to the respective opposing side sheet and said plurality of tines and forming a fixed second transverse pivot axis for said tines, said second transverse pivot axis being located generally above said stuffer assembly; and said tines extending from a location generally forwardly of and above the pickup reel to a location generally adjacent and between the floor roll and the starter roll whereby the tines may contact with crop material picked up by the pickup reel throughout its transport through the stuffer assembly and into the gap between the floor and starter rolls.

5. The wind guard of claim 4, wherein:

said tines are formed into a generally gentle downwardly facing curve in the area above said pickup and stuffer assembly.

6. The wind guard of claim 5, wherein:

each said first and second float arms extends forwardly to a location forward of and above said pickup mechanism, said plurality of tines extend generally downwardly is a generally gentle rearwardly facing curve before it begins the downwardly facing curve.

* * * * *